(12) United States Patent
Imura et al.

(10) Patent No.: US 6,917,429 B2
(45) Date of Patent: Jul. 12, 2005

(54) COLORIMETER

(75) Inventors: Kenji Imura, Toyohashi (JP); Kei Sakakibara, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 82 days.

(21) Appl. No.: 10/419,996

(22) Filed: Apr. 22, 2003

(65) Prior Publication Data

US 2003/0227627 A1 Dec. 11, 2003

(30) Foreign Application Priority Data

Apr. 23, 2002 (JP) ........................................ 2002-121090

(51) Int. Cl.⁷ ............................. G01J 3/46; G01N 21/25
(52) U.S. Cl. ........................ 356/405; 356/402; 356/417; 250/226; 250/214 R
(58) Field of Search ................................ 356/405, 402, 356/407, 408, 411, 417, 421; 250/226, 214 R (56) References Cited

U.S. PATENT DOCUMENTS

| | | | |
|---|---|---|---|
| 4,773,761 A | * | 9/1988 | Sugiyama et al. .......... 356/405 |
| 5,400,138 A | | 3/1995 | Peterson et al. |
| 5,859,709 A | * | 1/1999 | Imura .......................... 356/446 |
| 6,014,221 A | * | 1/2000 | Plude, Jr. .................... 356/402 |
| 6,535,278 B1 | * | 3/2003 | Imura .......................... 356/73 |
| 6,707,553 B1 | * | 3/2004 | Imura .......................... 356/402 |
| 2003/0011767 A1 | * | 1/2003 | Imura et al. ................ 356/326 |

* cited by examiner

*Primary Examiner*—Layla G. Lauchman
(74) *Attorney, Agent, or Firm*—McDermott Will & Emery LLP (57) ABSTRACT

A colorimeter or color measuring device measures color of a sample or an object, and displays measurement value or values according to user defined index or indices, calculated by a user-defined formula. Data of the user-defined formula is read in from outside of the colorimeter and converted into a coded form which can be executed by a controller of the calorimeter. The data of the user-defined formula or the coded data is stored in the colorimeter. Accordingly, the colorimeter has good portability and convenience despite its capability of expressing the colors of various samples or objects by user-defined original index or indices.

21 Claims, 9 Drawing Sheets

| SELECTION OF DISPLAY ITEMS | | |
|---|---|---|
| COLOR MEASUREMENT VALUE | INDEX | CLASS |
| XYZ | WI(ASTM313) | CCLS |
| Zxy | WI(CIE) | |
| L*a*b* | TV(CIE) | |
| L*C*h | CIDX | |

| DEFINING FORMULA STORAGE AREA | | |
|---|---|---|
| CCLS:=CLASS(CIDX,3,90,60,40,AA,A,B,C) | | |
| INDEX NAME STORAGE AREA | VARIABLE ADDRESS STORAGE AREA | THRESHOLD VALUE NUMBER STORAGE AREA |
| CCLS | Ax | 3 |
| THRESHOLD VALUE STORAGE AREA | CLASS NAME STORAGE AREA | |
| 90,60,40 | AA,A,B,C | |

SAMPLE NAME   XXXXXXXX   2001/05/05   10:00

MEASUREMENT NUMBER   11

| COLOR MEASUREMENT VALUE | INDEX | CLASS |
|---|---|---|
| $L*=50.5$ | CIDX=50.7 | CCLS=B |
| $a*=20.2$ | | |
| $b*=30.3$ | | |

COLORIMETER

This application is based on patent application No. 2002-121090 filed in Japan, the contents of which are hereby incorporated by references.

FIELD OF THE INVENTION

The present invention relates to a colorimeter or a color measuring device such as a direct reading type tristimulus colorimeter or a spectrocolorimeter and particularly to a colorimeter capable of expressing the color of an object to be measured, by a user-defined indices.

BACKGROUND OF THE INVENTION AND RELATED ART STATEMENT

In recent years, measurement of colors has become more and more important and color data such as spectral reflection coefficients and color measurement of various samples have been used at places of production in many fields such as painting, printing, textile, ceramics, agriculture, forestry and fishery industries. Particularly, in the food industry and the like, products are evaluated and/or are subjected to pass/fail tests with reference to particular or unique index or indices originally defined by a user and calculated using, as variables, color measurement values measured and calculated in accordance with a general-purpose calorimetric system such as an XYZ colorimetric system, an $L^*a^*b^*$ colorimetric system, or an $L^*C^*h^\circ$ calorimetric system.

The index or indices are often originally defined for each object to be evaluated, such as for coffee, tomatoes, beers, orange or juices, or are defined differently with the entities, units or organizations of the evaluators, such as among the countries, districts, industries or companies. Thus, it is almost impossible to store all these index or indices in a controller of a calorimeter beforehand.

Accordingly, in the case when colors of various samples, to be measured need to be expressed by user-defined index or indices, a manufacturer of colorimeters was requested to manufacture custom-model colorimeters with an additional calculating function for the user-defined index or indices. Or color measurement values according to a general-purpose calorimetric system were obtained by an external computing unit such as a personal computer from a colorimeter, in which the color measurement values are converted into the user-defined index or indices. However, in the case of manufacturing of the custom model, there exists a problem with many costs and longer time for remodeling of a generally used model. In the case of using the external computing unit, there is a problem that a special computing program must be prepared for converting the color measurement values into the user-defined indices. Further, in the latter case, since both the colorimeter and the external computing unit are always required for the measurement, there are additional problems that they are inferior in portability and convenience of handling.

SUMMARY OF THE INVENTION

In view of the problems residing in the prior art, an object of the present invention is to provide a colorimeter or a color measuring device having good portability and convenience despite its capability of expressing, by original index or indices, colors of various samples or objects to be measured.

According to an aspect of the present invention, a color measuring device for measuring color of an illuminated sample comprises a light dispersing unit for dispersing light reflected by or having passed through the sample, into a plurality of spectral band components; a photoelectric unit for receiving the dispersed light components and outputting electric signals representative of the intensities of the light components; a color measurement value producing unit for producing data of color measurement values according to a predetermined colorimetric system, from the electric signals; a receiver for receiving, from outside of the device, data of an index defining formula defined by a user; a memory for storing the data of an index defining formula; a first converter for converting the data of the index defining formula stored in the memory, into coded data; a second converter for executing the calculation according to the coded data of the index defining formula to convert the data of the color measurement values into data of the user-defined index; and a display for displaying the user-defined index converted by the second converter.

With the arrangement as described above, the user-defined index defining formula is stored in a memory upon being received. When the color measurement values by the predetermined calorimetric system are produced, the data of the user-defined index defining formula are converted into code data to be executed by the first converter. The color measurement values are converted into the user-defined index by executing the calculation according the coded index defining formula, and the resulting user-defined index is displayed on the monitor. The color measuring device or colorimeter according to the present invention as described above is provided with a memory for storing the data of an index defining formula and may be connected with an outside or external device only when such data is inputted to the colorimeter or the color measuring device. Accordingly, the calorimeter or the color measuring device may be operated independently and provides portability and convenience of handling.

According to another aspect of the present invention, a color measuring device for measuring color of an illuminated sample comprises a light dispersing unit for dispersing light reflected by or having passed through the sample, into a plurality of spectral band components; a photoelectric unit for receiving the dispersed light components and outputting electric signals representative of the intensities of the light components; a color measurement value producing unit for producing data of color measurement values according to a predetermined colorimetric system, from the electric signals; a receiver for receiving, from outside of the device, data of an index defining formula defined by a user; a first converter for converting the data of the index defining formula received by the receiver, into coded data; a memory for storing the coded data of the index defining formula, a second converter for executing the calculation according to the stored coded data of the index defining formula to convert the data of the color measurement values into data of the user-defined index; and a display for displaying the user-defined index converted by the second converter.

With the arrangement described above, the color measurement values are converted into the user-defined index by executing the calculation according the stored coded index defining formula, and the resulting user-defined index are displayed on the monitor. The color measuring device or colorimeter according to the present invention as described above is provided with a memory for storing the coded data of an index defining formula and may be connected with an outside or external device only when such data is inputted to the colorimeter or the color measuring device. Accordingly, the colorimeter or the color measuring device may be operated independently and provides portability and convenience of handling.

According to further aspect of the present invention, a method for converting data of color measurement values according to a predetermined colorimetric system, into index defined by a user, comprises receiving, from outside, data of an index defining formula defined by a user; dispersing light reflected by or having passed through an illuminated sample, into a plurality of spectral band components; receiving the dispersed light components and outputting electric signals representative of the intensities of the light components; producing data of color measurement values according to a predetermined colorimetric system, from the electric signals; converting the data of the index defining formula received from the outside, into coded data; executing the calculation according to the coded data of the index defining formula to convert the data of the color measurement values into data of the user-defined index; and displaying the converted user-defined index.

With the method as described above, the color measurement values are converted into the user-defined index by executing the calculation according the stored coded index defining formula, and the resulting user-defined index is displayed on the monitor.

These and other objects, features and advantages of the present invention will become more apparent upon a reading of the following detailed description and accompanying drawings.

DETAILED DESCRIPTION OF THE PREFERRED EMBODIMENTS

Figure 1:
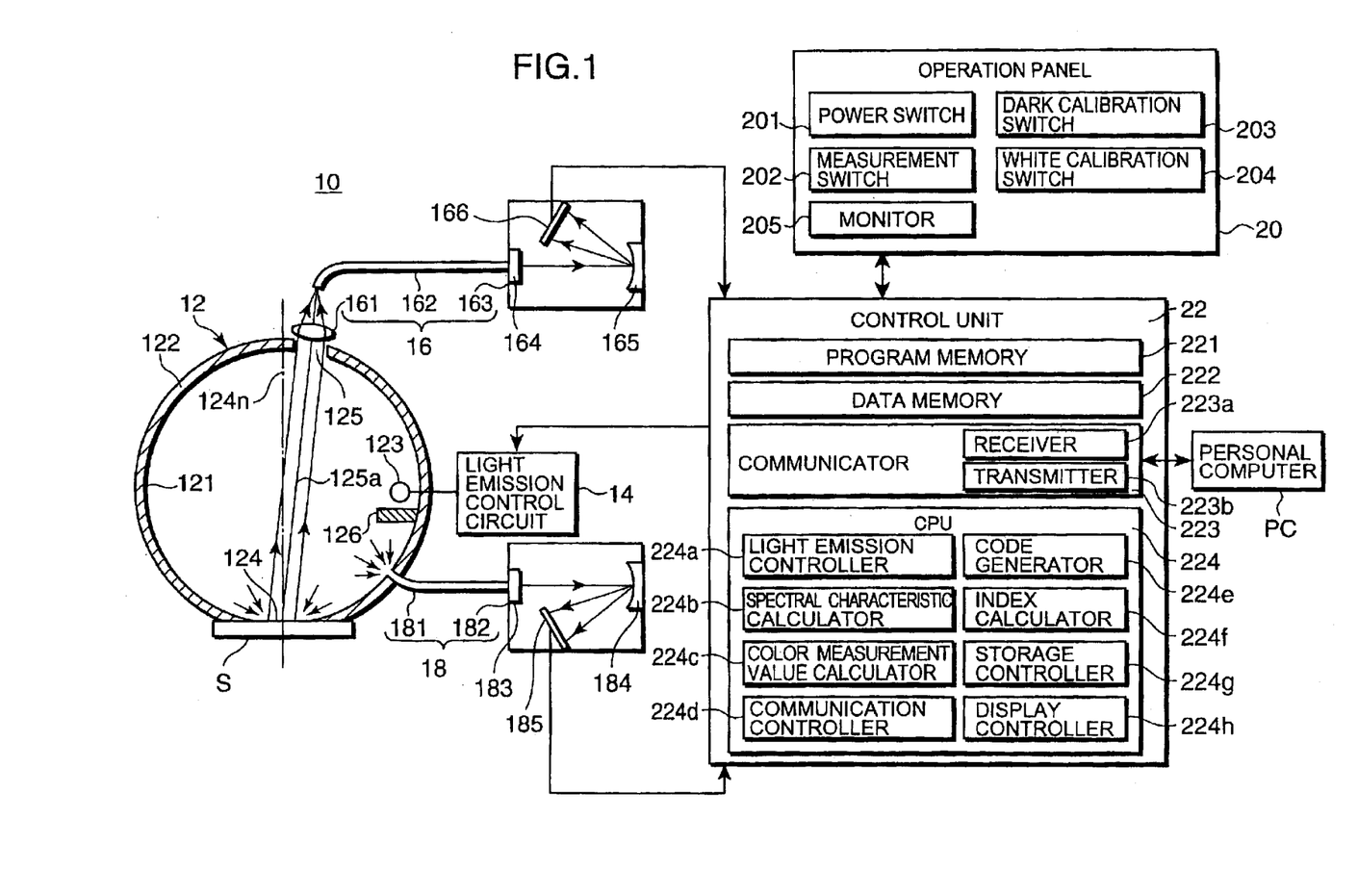
FIG. 1 schematically illustrates an arrangement of a colorimeter according to one embodiment of the invention.

FIG. 1 schematically illustrates an arrangement of a spectrocolorimeter or a color measuring device according to an embodiment of the invention. In FIG. 1, a colorimeter 10 measures a spectral reflection characteristic of a sample S to be measured, and includes an integrating sphere 12, a light emission control circuit 14, a sample light measuring device 16, a reference light measuring device 18, an operation panel 20 and a control unit 22. The colorimeter 10 is designed to communicate with an external personal computer PC. It should be understand that the external device for communicating with the calorimeter 10 may not limited to the personal computer but may be a work station or a host computer or the like directly or indirectly (e.g. via LAN or internet) connected with the colorimeter 10.

The integrating sphere 12 is provided with a hollow spherical body 122 having an inner wall 121 coated with a white light diffusing and reflecting paint to provide a high diffusing property and a high reflectivity, such as magnesium oxide or barium sulfate, and a light-source lamp 123 such as a xenon flash lamp located inside the spherical body 122. A light emitted from the lamp 123 is reflected many times by the inner wall 121 to produce diffused light.

The spherical body 122 has a sample opening 124 formed at its bottom end and a light receiving opening 125 opposing the sample opening 124 at a position along a line inclined by 8° with respect to a normal 124n to the plane of the sample opening 124. A light-blocking wall 126 projects from the inner wall 121 below the light-source lamp 123 in the spherical body 122 to block the light emitted from the light-source lamp 123 from directly entering the sample opening 124.

Figure 2:
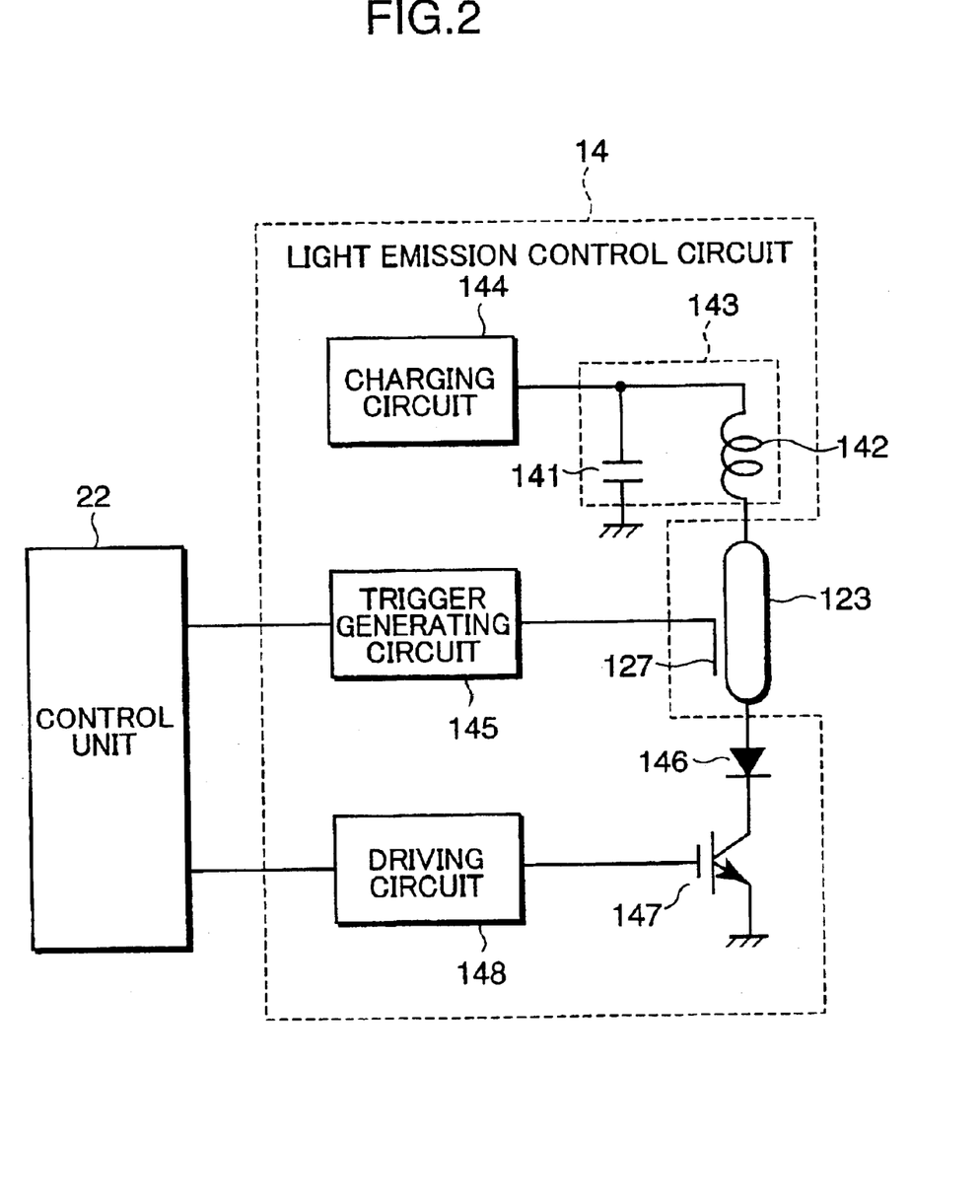
FIG. 2 is a diagram showing an exemplary arrangement of a light emission control circuit.

The light emission control circuit 14 causes the light-source lamp 123 to emit a light. For example, as shown in FIG. 2, the light emission control circuit 14 is provided with a boosting circuit 143 including a main capacitor 141 and a booster coil 142 for applying a high DC voltage of several hundreds bolts to one electrode of the light-source lamp 123, a charging circuit 144 for charging the main capacitor 141, a trigger circuit 145 for applying a high AC voltage of several ten thousands bolts to a trigger electrode 127 formed of a metallic wire closely wound on the light-source lamp 123, a diode 146 connected with the other electrode of the light-source lamp 123, and a driving circuit 148 for applying a drive voltage to the light-source lamp 123 via a semiconductor switching element 147 such as an IGBT.

With the light emitting circuit 14 thus constructed, when a high AC voltage is momentarily applied to the trigger electrode 127 by the trigger circuit 145 with the semiconductor switching element 147 being turned on and a high DC voltage being applied across the electrodes of the light-source lamp 123 by the boosting circuit 143, the light-source lamp 123 is triggered and a DC current flows from the boosting circuit 143 to cause the light-source lamp 123 to emit a light. By controlling the off-timing of the semiconductor switching element 147 after the start of the light emission of the light-source lamp 123, the period of the light emission by the light-source lamp 123 can be controlled.

The sample light measuring section 16 is composed of a light receiving optical system 161, an optical fiber 162, and a sample light spectrum sensor 163. The light receiving optical system 161 is provided close to the light-receiving opening 125 of the spherical body 122 to receive and converge components 125a of the light rays (hereinafter, referred to as sample light) reflected by the sample S and going out of the light-receiving opening while the sample is located at the sample opening 124 and illuminated by the diffused light. The components 125a of the light to be received by the light receiving optical system are components of the light reflected by the sample and travels in the direction of 8° to the normal 124n. The light receiving optical system 161, then, focuses the components 125a of the light at an incident end of the optical fiber 162. In this way, the light components reflected by the sample S in the direction of 8° to the normal 124n are introduced to the sample light spectrum sensor 163 through the optical fiber 162.

The sample light spectrum sensor 163 is provided with an infrared cutting filter 164, a diffraction grating 165 and a sample light sensor array 166. The infrared cutting filter 164 is provided near an emergent end of the optical fiber 162 and cuts spectral components in an infrared wavelength range, for example, exceeding 800 nm. The diffraction grating 165 reflects the sample light incident thereon through the infrared cutting filter 164 while dispersing the light according to wavelength. Although a reflection-type concave diffraction grating is used as the diffraction grating 165 in this embodiment, a transmission-type diffraction grating may be used.

The sample light sensor array 166 is composed of a plurality of photoelectric elements arrayed in a direction of wavelength dispersed by the diffraction grating 165, and these photoelectric elements receive lights of different wavelengths to output electrical signals indicative of received light intensities.

A spectrocolorimeter having a d/8°-geometry layout is composed by the integrating sphere 12 and the sample light measuring device 16.

The reference light measuring device 18 is provided with an optical fiber 181 and a reference light spectrum sensor 182. An incident end of the optical fiber 181 is located at a specified position of the spherical body 122 (for example, at a position where the light from the light-source lamp 123 and the sample light are not directly incident thereon), and the light diffused in the spherical body 122 is introduced, as a reference light, to the reference light spectrum sensor 182 through the optical fiber 181.

The reference light spectrum sensor 182 has substantially the same construction as the sample light spectrum sensor 163. Specifically, the reference light spectrum sensor 182 is provided with an infrared cutting filter 183 for cutting light components in a wavelength range, for example, exceeding 800 nm, a diffraction grating 184 for reflecting the reference light incident thereon through the infrared cutting filter 183 while dispersing the light according to wavelength, and a reference light sensor array 185 composed of a plurality of photoelectric elements arrayed in a direction along which the light is dispersed according to wavelength by the reflection-type concave diffraction grating 184. It should be noted that a transmission-type diffraction grating may be used instead of the reflection-type concave diffraction grating 184.

The operation panel 20 is provided on the front surface of a main body of the colorimeter 10 and includes a power switch 201, a measurement switch 202, a dark calibration switch 203, a white calibration switch 204, and a monitor 205 such as a LCD (liquid crystal display) forming a display device for displaying measured results and the other related data.

The control unit 22 controls the operation of the calorimeter 10 and is provided with a program memory 221, a data memory 222, a communicator 223 and a CPU (central processing unit) 224. Although the control unit 22 is further provided with an analog-to-digital (A/D) converter and other necessary electronic circuits, they are known per se in the art and are not shown in the drawing.

Figure 3:
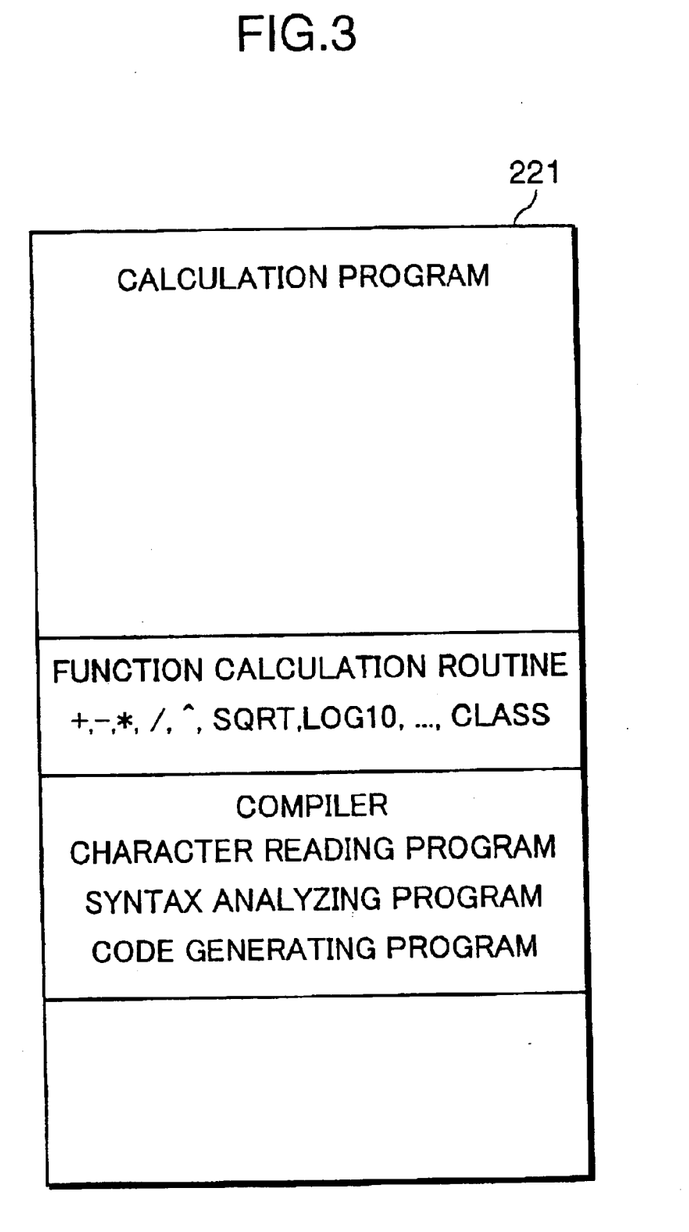
FIG. 3 is a chart showing data stored in a program memory.

The program memory 221 is formed by, for example, a ROM, which stores, in a specified storage areas as shown in FIG. 3, a calculation program for executing a process to obtain color measurement values by a preset general-purpose calorimetric system such as an XYZ colorimetric system, an L* a*b* calorimetric system or an L*C*h° colorimetric system and a process to convert the color measurement values expressed by the general-purpose calorimetric system into values expressed by user-defined indices. The process to convert the color measurement values expressed by the general-purpose colorimetric system into values expressed by the user-defined indices is executed using data of index functions defined by a user, transmitted from the externally connected personal computer PC and read in by the colorimeter 10.

The user-defined index functions are described in a format, for example, similar to the one used in Excel (registered trademark) which is a spread sheet software developed by Microsoft Corporation, and data are inputted to the personal computer PC by means of a keyboard or the like. The data inputted to the personal computer PC are transmitted to the control unit 22 via a RS-232C interface and the communicator 223 by means of a generally used communication software such as HyperTerminal (registered trademark).

Since the data of the index functions transmitted from the personal computer PC are in the form of text data of index defining formulae, the colorimeter 10 needs to read, from the received text data, the data of the index function defining formulae and analyze the syntax of the index functions to generate coded data for enabling execution of the process to convert the color measurement values expressed by the general-purpose calorimetric system into the values expressed by the user-defined indices. Thus, besides the calculation program, the program memory 221 stores in its specified storage areas, a character reading program, a compiler program including a syntax analyzing program and a code generating program, and a function calculation routine program for performing addition, subtraction, multiplication, division, power operation, square root calculation, exponential calculation, logarithmic calculation and other kinds of calculation used in the index defining formulae.

The data memory 222 is composed of, for example, a RAM for temporarily saving data. The data memory 222 temporarily saves therein the calculation program read from the program memory 221 and various data generated by execution of the operation program. The text data defining the index functions received by the communicator 223 are also stored in the data memory 222. A method for saving, in the data memory 222, the text data of the user index defining formulae expressed by the index functions will be described later.

The communicator 223 is provided with a receiver 223a and a transmitter 223b and conducts data communication, for example, with the personal computer PC externally connected via the RS-232C interface as described above. The personal computer PC transmits, to the calorimeter 10, the data of the index defining formulae defined by the user which is the text data described in the format similar to the one used in Excel (registered trademark) which is a spread sheet software developed by Microsoft Corporation, with the transmission of the data being made by means of the generally used communication software such as HyperTerminal (registered trademark) as described above.

The CPU 224 executes calculation in accordance with the programs stored in the program memory 221 and is provided with function performing units as a light emission controller 224a, a spectral characteristic calculator 224b, a color measurement value calculator 224c, a communication controller 224d, a code generator 224e, an index calculator 224f, a storage controller 224g and a display controller 224h.

The light emission controller 224a sends a control signal to the light emission control circuit 14 to control the light emission of the light-source lamp 123 when the measurement switch 202 on the operation panel 20 is pushed.

The spectral characteristic calculator 224b calculates spectral reflection coefficients of the sample S placed at the sample opening 124, in accordance with spectral intensity signals outputted from the sensor arrays 166 and 185, thereby obtaining spectral characteristics.

The color measurement value calculator 224c calculates measurement values of the sample S based on the general-purpose colorimetric system such as the XYZ colorimetric system, the L*a*b* calorimetric system or the L*C*h° calorimetric system in accordance with known calculating formulae using the spectral reflection coefficients calculated by the spectral characteristic calculator 224b.

The communication controller 224d controls the operation of the communicator 223 and also check syntax errors in the index function defining formulae. In other words, the communication controller 224d checks syntax errors in the data of the index function defining formulae received by the receiver 223a and sends the checked result, back to the personal computer PC if there is any error.

The code generator 224e parses the data of the index function defining formulae transmitted from the personal computer PC and described in a mathematical format understandable by human, and replaces them by code data with which the control unit 22 can execute calculating process.

The index calculator 224f converts the color measurement values calculated by the color measurement value calculator 224c into values expressed by the user-defined indices, by executing the calculations with the coded index defining formulae replaced by means of the code generator 224e.

The storage controller 224g saves the color measurement values calculated by the color measurement value calculator 224c and the received index function defining formulae, in the specified storage areas of the data memory 222. Specifically, when the communicator 223 receives the data (text data) of the index function defining formulae described in mathematical format understandable by human, the storage controller 224g extracts the text of the index names and the text of the index function defining formulae by the character reading program of the compiler program and saves them in an index name storage area and an index defining formula storage area of the data memory 222, respectively. The storage controller 224g also saves the code data replaced by the code generator 224e in a specified storage area of the data memory 222.

The display controller 224h displays, on a display screen of the monitor 205, the color measurement values calculated by the color measurement value calculator 224c, the values according to the user-defined index calculated by the index calculator 224f, etc.

Next, the index functions used in this embodiment are described. There are two kinds of index functions, "numerical index function" and "class index function". The user can define either one of them or both of them.

Here, the numerical index functions is a function $f(x_1, \ldots x_n)$ of a combination of addition, subtraction, multiplication, division, power calculation, square root calculation, exponential calculation, logarithmic calculation, etc. using a plurality of color measurement values (color values) $x_1, \ldots x_n$ as variables for the calculation of an index y, with the calculation being expressed by following equation (1). Here, the color measurement values as variables may color measurement values according to the XYZ calorimetric system, the L*a*b* colorimetric system, the L*C*h° calorimetric system or the like.

$$y = f(x_1, x_2, \ldots x_n) \tag{1}$$

For example, if the index function f for the color measurement value (L*a*b*) according to the L*a*b* colorimetric system is defined to be: $y=\sqrt{(L^{*2}+10\times(b^*/a^*)^2)}$, the defining formula is written as in following equation (2) in this embodiment.

$$\mathrm{CIDX} := \mathrm{SQRT}(L^{*\wedge}2 + 10*b^{*\wedge}2/a^{*\wedge}2) \tag{2}$$

In equation (2), "CIDX" is an index name and can be expressed in any arbitrary text up to, for example, eight characters. "SQRT" is a function name for square root calculation, and "L*^2+10*b*^2/a*^2" is a defining formula corresponding to "$L^{*2}+10\times(b^*/a^*)^2$".

The numerical index function defining formula described by the equation (2) is transmitted, for example, as a text following a command SIX (Send User Index), from the personal computer PC to the colorimeter 10. When the colorimeter 10 receives the command SIX, the control unit 22 recognizes it as a transmission command of the numerical index function and extracts the text "CIDX" before ":=" in the text "CIDX:=SQRT(L*^2+10*b*^2/a*^2)" defining the numerical index function following this command as the text of the numerical index name and the text "SQRT(L*^2+10*b*^2/a*^2)" after ":=" as the text of the numeral index function defining formula.

Figure 4:
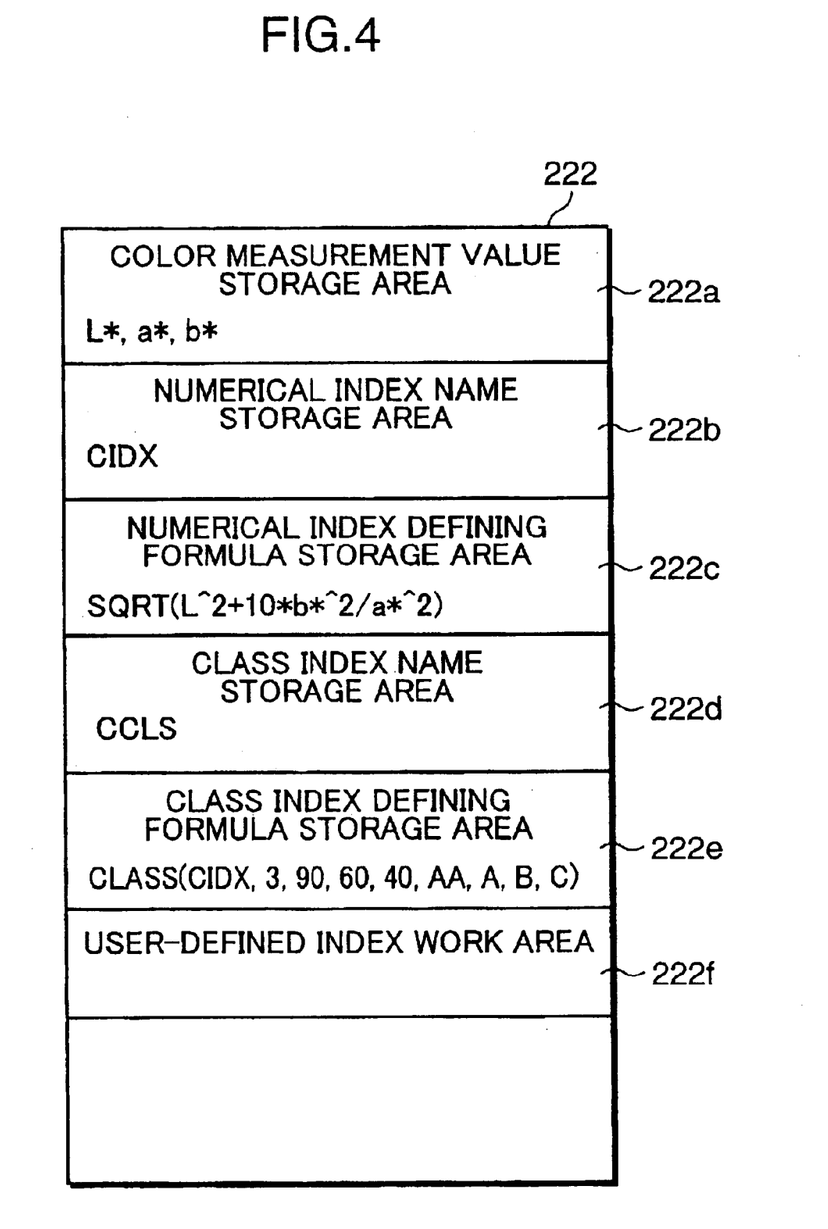
FIG. 4 is a chart showing exemplary data storage areas in a data memory for storing received data.

Then, as shown in FIG. 4, the text data of the numerical index name "CIDX" is saved in a numerical index name storage area 222b of the data memory 222, and the text data of the numerical index function defining formula is saved in a numerical index defining formula storage area 222c of the data memory 222. It should be noted that the color measurement values (L*a*b*) according to the L*a*b* calorimetric system are saved in a color measurement value storage area 222a of the data memory 222.

The class index function uses a color measurement value x as a variable and calculates a class value y to which the variable belongs of the classes defined in advance by a classifying function h. The class index function is expressed by following equation (3). One color measurement value by the general-purpose colorimetric system such as the XYZ colorimetric system, the L*a*b* calorimetric system or the L*C*h° calorimetric system is used as the color measurement value x as the variable. The class index function may use numerical index calculated by a numerical index function defined by a user as a variable x.

$$y = h(x, n, b_1 \ldots b_n, c_1 \ldots c_{n+1}) \tag{3}$$

In equation (3), $b_1 \ldots b_n$ are threshold values for classifying the variable x, n is the number of the threshold values, $c_1 \ldots c_{n+1}$ are class values of (n+1) classes classified by n threshold values. A relationship between the class values $c_1 \ldots c_{n+1}$ and the variable x is:

| | |
|---|---|
| $x < b_1$ | $c_1$ |
| $b_1 \leq x < b_2$ | $c_2$ |
| $b_2 \leq x < b_3$ | $c_3$ |
| ... | ... |
| $b_n \leq x$ | $c_{n+1}$ |

For example, in the case of classifying the numerical index CIDX calculated by the numerical index function SQRT defined by equation (2) with respect to the variable x as follows:

| | |
|---|---|
| x < 40 | C |
| 40 ≦ x < 60 | B |
| 60 ≦ x < 90 | A |
| 90 ≦ x | AA, | the class value can be written as in equation (4) in this embodiment:

$$\text{CCLS:=CLASS (CIDX, 3, 90, 60, 40, AA, A, B, C)} \quad (4).$$

In equation (4), "CCLS" is a class name. The class name can be expressed by an arbitrary text composed of up to 8 characters. "CLASS" is the name of a function for calculating a classification, and "CIDX, 3, 90, 60, 40, AA, A, B, C" is a defining formula of a classifying method.

The data of the defining formula of the class index function expressed by equation (4) is transmitted from the personal computer PC to the colorimeter 10 as a text following a command SCL (send classification). When the calorimeter 10 receives the command SCL, the control unit 22 recognizes it as a transmission command for the class index function and extracts the text "CCLS" before ":=" in the text "CCLS:=CIDX, 3, 90, 60, 40, AA, A, B, C" defining the class index function following this command as the text of the class index name and the text "CLASS (CIDX, 3, 90, 60, 40, AA, A, B, C" after ":=" as the text of the class index function defining formula. Then, the control unit 22 saves the text data of the class index name "CCLS" in a class index name storage area 222d of the data memory 222 and saves the text data of the class index function defining formula in a class index defining formula storage area 222e of the data memory 222.

Next, the color measuring process of the calorimeter 10 will be described with reference to FIGS. 5 through 10. In the following description, it is assumed that the numerical index function CDIX and the class index function CCLS defined by a user and expressed by equations (2) and (4) are transmitted from the personal computer PC and read by the colorimeter 10, and that the user causes the monitor 205 to display a display item selection screen and selects a desired displayed item prior to a measurement.

Figure 5:
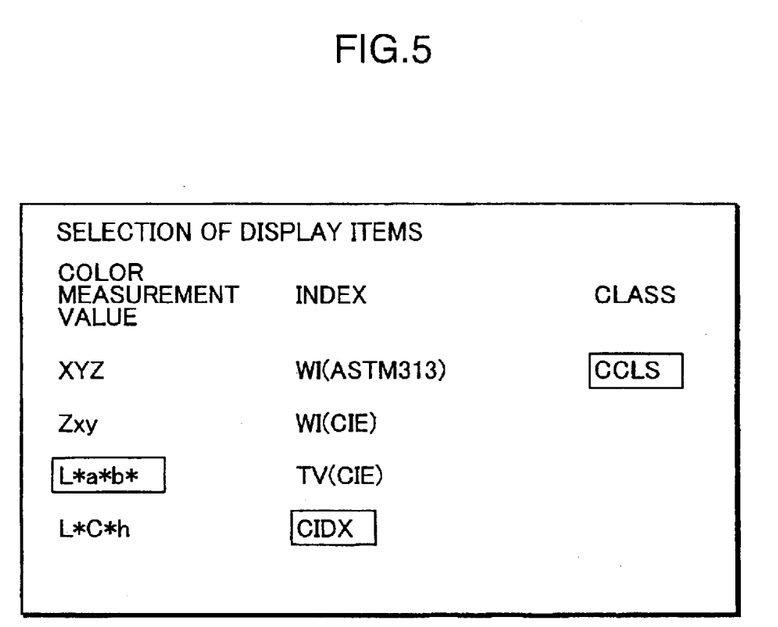
FIG. 5 is a diagram showing an exemplary display of selection screen for selection of items.

FIG. 5 shows an exemplary display item selection screen to be displayed by the monitor 205. In the left column of the screen are displayed selection items for the selection of the calorimetric systems which are applied for calculation of the color measurement value by the color measurement value calculator 224c of the control unit 22. In this embodiment, the XYZ colorimetric system, the L*a*b* colorimetric system and the L*C*h° calorimetric system are selectable. In the middle column of the screen are displayed selection items for the selection of numerical indices. A numerical index CIDX is defined by the user by means of the personal computer PC and is read into the colorimeter 10 through communication channel between the colorimeter 10 and the personal computer PC. Other numerical indices WI(ASTM313), WI(CIE), TV(CIE) are general numerical indices and are provided in the colorimeter 10 beforehand as standards.

In the right column of the screen are displayed a selection item for the selection of a class index. A class index CCLS is defined by the user by means of the personal computer PC and is read into the calorimeter 10 through the communication channel between the calorimeter 10 and the personal computer PC. Since the class indices are defined by the user, only the one read into the colorimeter 10 through communication channel between the colorimeter 10 and the personal computer PC is displayed as the selected item. In the present embodiment, only one kind of the class index is displayed on the presumption that one kind of class index CCLS is defined and read in the calorimeter 10. However, it may be easily understood that a plurality of class indices may be displayed when the user defines them.

In FIG. 5, selected items are shown by being respectively enclosed by rectangular frames. As the user operates an selection switch (in the form of up/down keys, or the like not shown in the Figure) on the operation panel 20, the rectangular frame moves to enclose different item. When the user operates a confirmation switch (not shown) on the operation panel 20 while the desired items are enclosed by the rectangular frames, these desired items are set as display items. In the example of FIG. 5, such a selection is made that the color measurement values are measured by the L*a*b* colorimetric system and are converted into the numerical index CIDX and the class index CCLS defined by the user, so that the converted indices are displayed.

Figure 6:
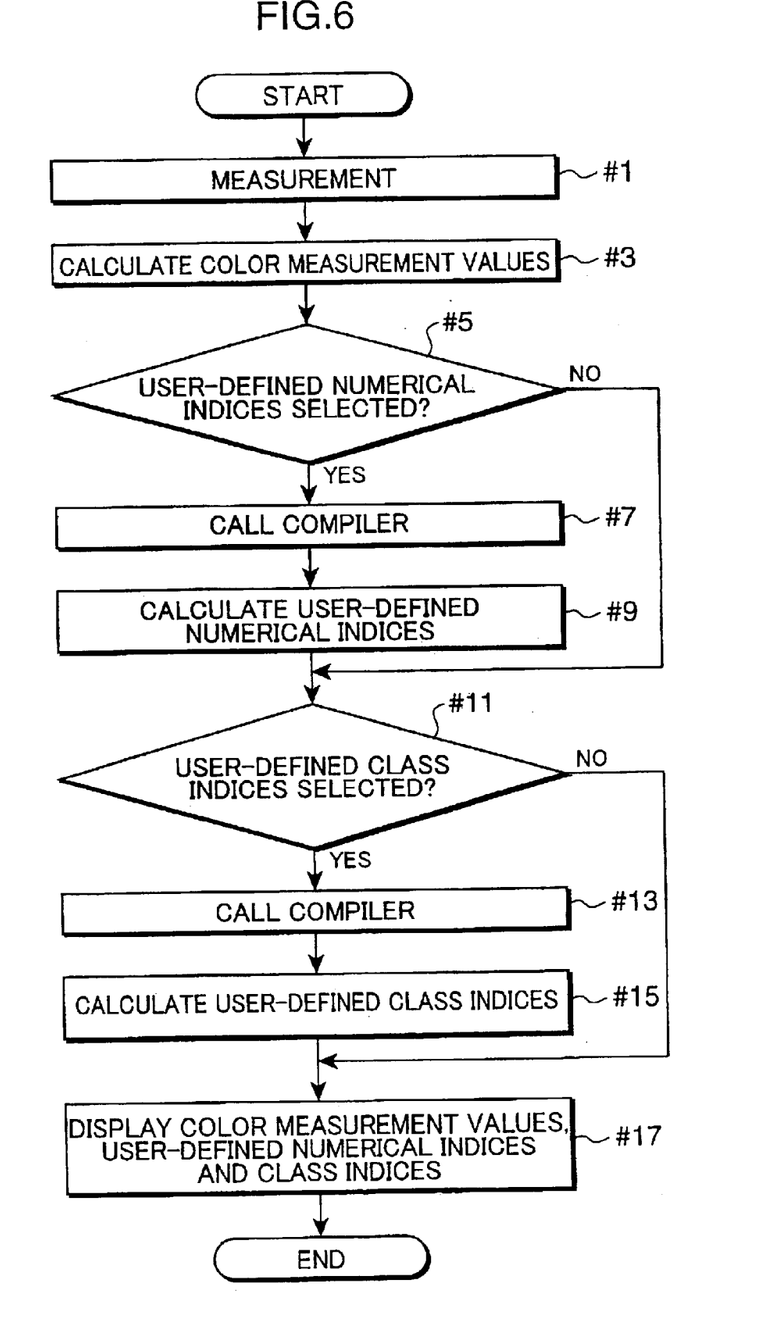
FIG. 6 is a main flow chart of a color measuring process.

FIG. 6 is a main flow chart of the color measuring process of the colorimeter 10. When the user (measurer) operates the measurement switch 202 to input a measurement initiating or command signal to the control unit 22, the control unit 22 actuates the light emission control circuit 14 causing the light-source lamp 123 to emit a light, thereby initiating the measurement of the sample S (Step #1).

Specifically, flash of light emitted from the light-source lamp 123 is reflected a number of times by the inner wall of the spherical body 122 to be diffused light, and illuminates the sample S placed at the sample opening 124. The components 125a of the light reflected by the sample S and traveling in the 8° direction to the normal 124n are incident on the optical fiber 162 through the light receiving opening 125 and introduced to the sample light spectrum sensor 163 via the optical fiber 162. A part of the light reflected by the inner wall of the spherical body 122 is incident on the optical fiber 181 and introduced to the reference light spectrum sensor 182 via the optical fiber 181.

The light introduced to the sample light spectrum sensor 163 (hereinafter referred to as a sample light) is dispersed to a plurality of wavelength components (wavelength bands) at specified wavelength intervals by the diffraction grating 165 after the infrared components of the light (components having a wavelength of 800 nm or longer) are cut by the infrared cutting filter 164. The lights of the respective wavelength components are converted into electrical signals representative of their intensities by means of the corresponding photoelectric elements of the sample light sensor array 166 and the electrical signals are outputted to the control unit 22.

A light dispersing process similar to the one performed by the sample light spectrum sensor 163 is performed by the reference light spectrum sensor 182. Specifically, the light introduced to the reference light spectrum sensor 182 (hereinafter, referred to as a reference light) is dispersed into a plurality of wavelength components (wavelength bands) at specified wavelength intervals by the diffraction grating 184 after the infrared components of the light (components having a wavelength of 800 nm or longer) are cut by the infrared cutting filter 183. The lights of the respective wavelength components are converted into electrical signals representative of their intensities, by means of the corresponding photoelectric elements of the reference light sensor array 185, and the electrical signals are outputted to the control unit 22.

Subsequently, the color measurement values are calculated (Step #3). Specifically, in the control unit 22, the spectral characteristic calculator 224b calculates the spectral reflection coefficients of the respective wavelength components, using the data of the light intensities inputted from the sample light spectrum sensor 163 and representing the intensities of the lights dispersed from the sample light, and the data of the lights intensities inputted from the reference light spectrum sensor 182 and representing the intensities of the lights dispersed from the reference light. Then, the color measurement value calculator 224c calculates color measurement values from these spectral reflection coefficients in accordance with the preset colorimetric system using specified equations. For example, a color measurement values (L*a*b*) are calculated if the L*a*b* calorimetric system is set in advance.

It is then determined by the control unit 22 whether the numerical indices defined by the user have been selected (whether the numerical index CIDX has been selected in the example of FIG. 5) (Step #5). If the numerical indices have been selected (YES at Step #5), the compiler program is read from the program memory 221 (Step #7) and the index calculator 224f executes this compiler program to convert the color measurement values into the numerical indices (Step #9). Specifically, the conversion into the numerical indices is executed in accordance with a flow chart shown in FIG. 7.

Figure 7:
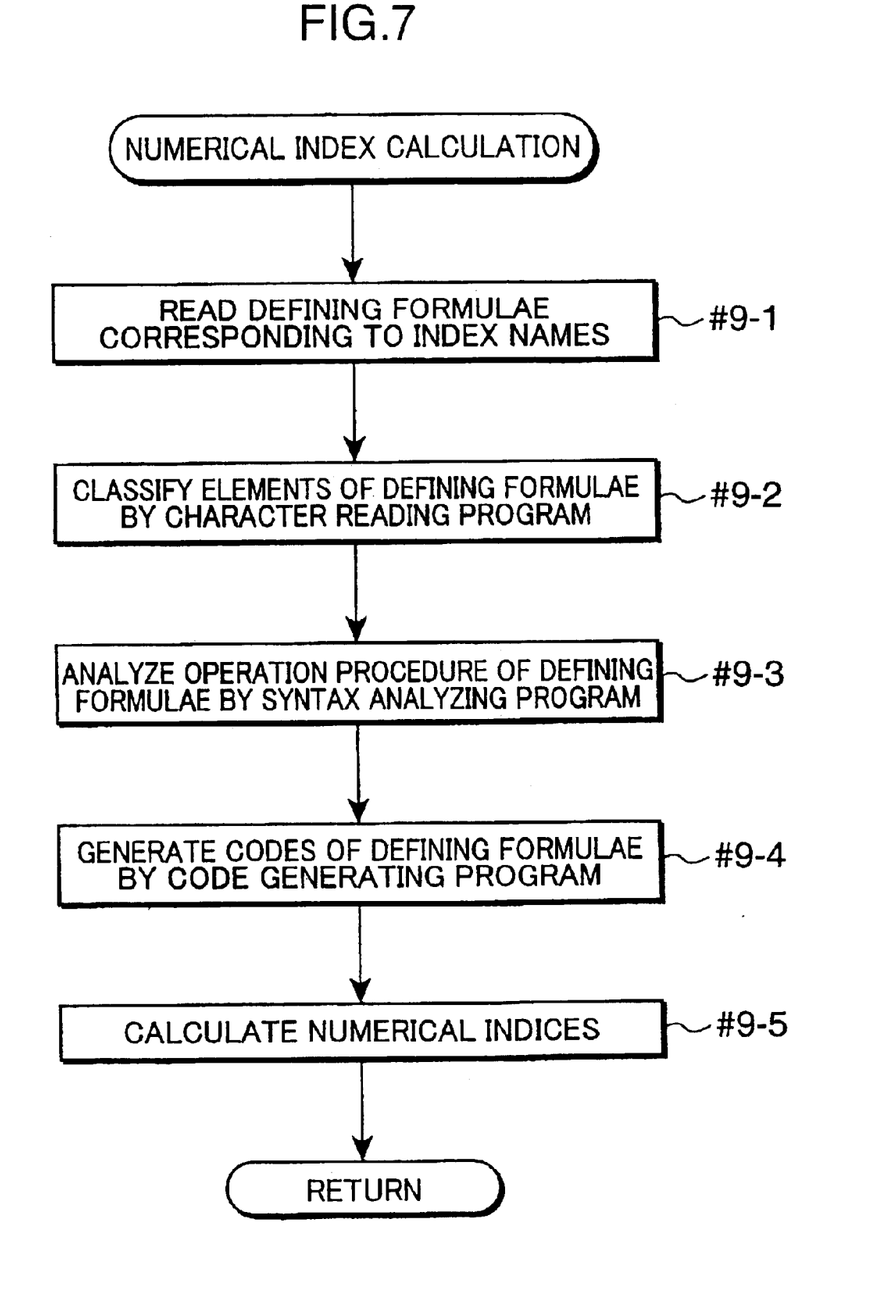
FIG. 7 is a flow chart showing a process of calculating numerical indices.

The numerical index data corresponding to the index names saved in the numerical index defining formula storage area 222c (see FIG. 4) of the data memory 222 are read (Step #9-1), and the character reading program of the compiler program is executed with this numerical index data, thereby identifying and classifying the elements of the defining formulae composed of the text of the numerical indices (Step #9-2). The result of the identification is saved in a user-defined index work area 222f of the data memory 222.

The numerical index defining formulae are composed of selectable variables ((X,Y,Z), (L*,a*,b*), (L*,C*,h°), etc.), constants, and operators (+, −, *, /, ^, SQRT, (,), Log, LN, SIN, COS, TAN, ASIN, ACOS, ATAN, ABS, TRUNC, etc.) and are written in one line in a format similar to that of Excel (registered trademark). Thus, the control unit 22 recognizes, by means of the character reading program, what elements, i.e. what variables, constants and operators compose the numerical index defining formulae, and classifies the respective elements. It should be noted that the syntax errors in the defining formulae are checked again while the defining formulae are being read.

In the example of FIG. 4, since the numerical index CIDX is written as "SQRT(L*^2+10*b*^2/a*^2)", the defining formula therefor is recognized to be composed of variables (L*,a*,b*), constants (coefficient 10, power 2), and operators (SQRT, ^, *, /).

Upon completion of the reading of the numerical index defining formulae, the syntax-analyzing program of the compiler program is executed to analyze the calculation procedure of the calculation formulae which compose the defining formulae, and to determine the order of the calculations of partial calculation formulae in the calculation procedure (Step #9-3). For example, in the calculation formula of "SQRT(L*^2+10*b*^2/a*^2)", the partial calculation formulae in the calculating procedure are analyzed to be: A=L*^2, B=b*^2, C=10*B, D=a*^2, E=C/D, F=A+E, CIDX=SQRT(F) and a calculating order of A→B→C→D→E→F→CIDX is determined.

Upon completing the analysis of the numerical index defining formulae, the code-generating program of the compiler program is executed to replace the partial calculation formulae by the codes of the calculations executable in the control unit 22 in accordance with the calculation order determined as mentioned above. (Step #9-4). Then, the numerical index CIDX is calculated by executing the code-based calculation of the defining formulae (Step #9-5). In this case, the calculations of the partial calculation formulae are executed using the function calculation routine program stored in the program memory 221 as the need arises. In the above example, the calculation of CIDX=SQRT(F) is executed using the function calculation routine program of "SQRT."

Referring back to FIG. 6, it is determined in the control unit 22 whether the class indices defined by the user have been selected (Step #11). If the class indices defined by the user have been selected (YES in Step #11), the compiler program is read from the program memory 221 (Step #13) and the index calculator 224f executes this compiler program to convert the color measurement values into class indices (Step #15). Specifically, the conversion into the class indices is executed in accordance with a flow chart shown in FIG. 8.

Figure 8:
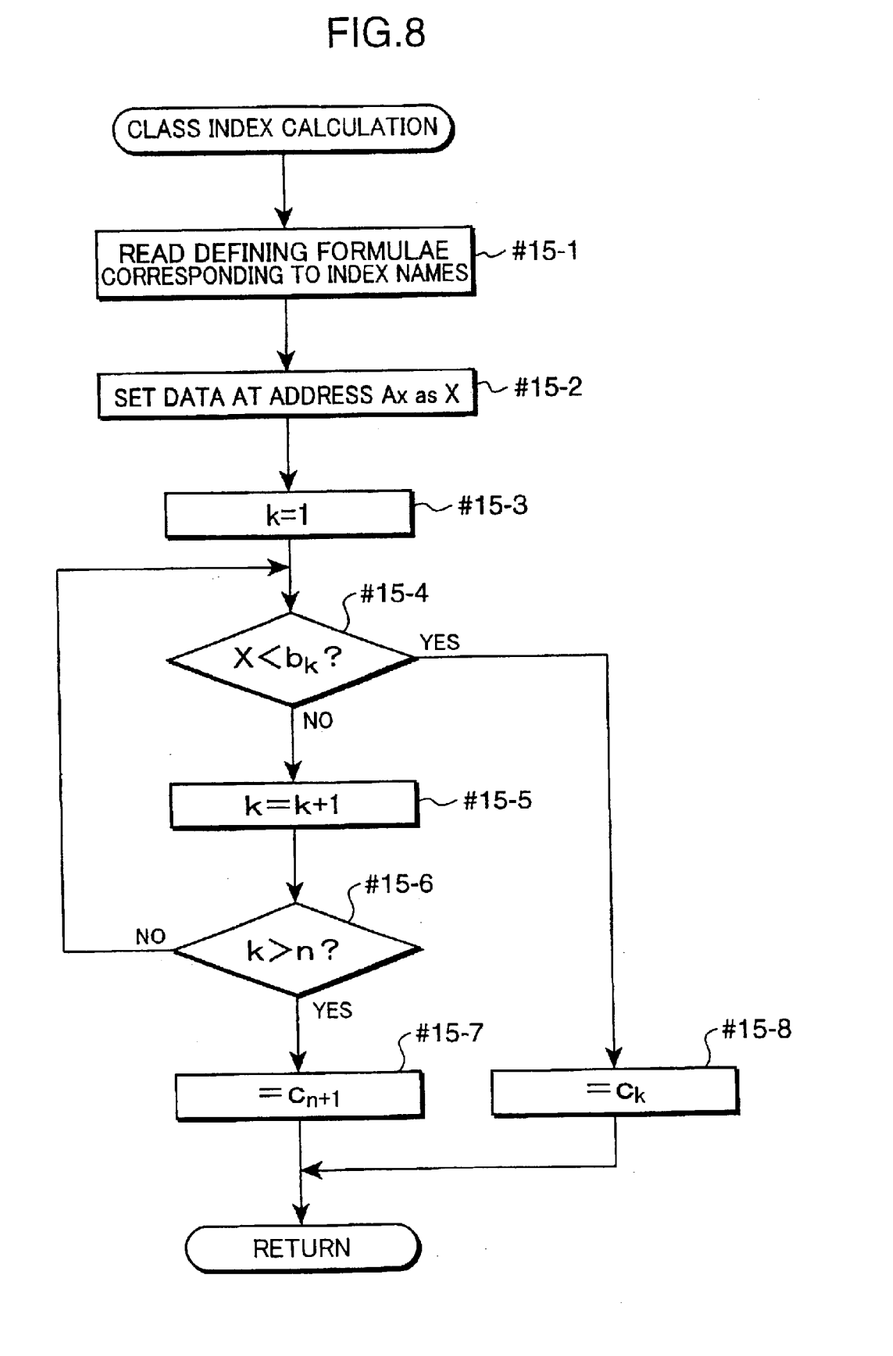
FIG. 8 is a flow chart showing a process of calculating a class index.

The class index data corresponding to the index names saved in the class index defining formula storage area 222e (see FIG. 4) of the data memory 222 is read (Step #15-1), and the character reading program of the compiler program is executed for this class index data so that the elements of the defining formula composed of the text of the class index are identified and classified. (Step #15-2). Since the class index defining formula is written in the format of "CLASS (x, n, $b_1 \ldots b_n$, $c_1 \ldots c_{n+1}$)", the operator CLASS, the variable x, the number of threshold values n, threshold values $b_1 \ldots b_n$, and class names $c_1 \ldots c_{n+1}$ are identified, and result of the identification is saved in the user-defined index work area 222f of the data memory 222.

Figure 9:
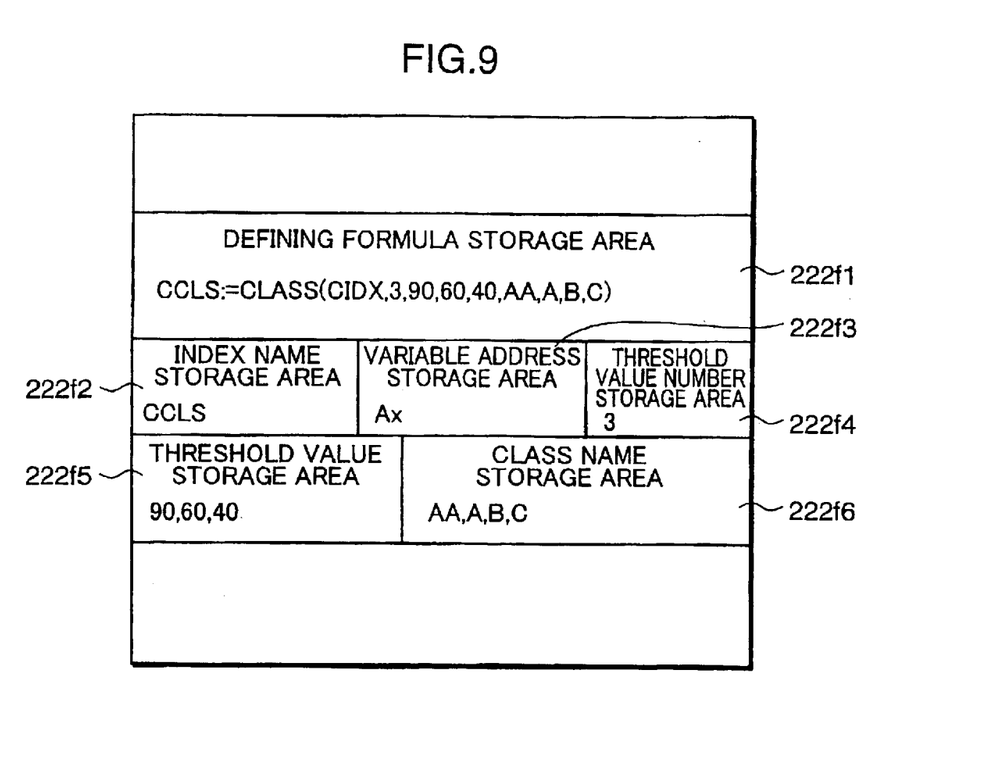
FIG. 9 is a chart showing exemplary data storage areas in an work area for user-defined indices for the class index calculating process.

FIG. 9 is a chart showing an example of the result of the identification of the class index defining formulae saved in the user-defined index work area 222f. In the user-defined index work area 222f are set an index defining formula storage area 222f1, an index name storage area 222f2, a variable address storage area 222f3, a threshold value number storage area 222f4, a threshold value storage area 222f5 and a class name storage area 222f6, and corresponding data are saved in the respective areas. In the example shown in FIG. 4, since the defined class index function is CCLS:= CLASS (CIDX, 3, 90, 60, 40, AA, A, B, C), this defining formula is saved in the defining formula storage area 222f1 and "CCLS" is saved in the index name storage area 222f2. Further, the number of threshold values "3" is saved in the threshold value number storage area 222f4; the threshold values "90, 60, 40" are saved in the threshold value storage area 222f5; and "AA, A, B, C" are saved in the class name storage area 222f6. Still further, an address Ax of the numerical index CDIX calculated at Step #9 is saved in the variable address storage area 222f3.

Subsequently, a calculation program for the function CLASS is read from the program memory 221 and read into the index work area 222f of the data memory 222. The class indices are calculated by executing Steps #15-2 to #15-8 in accordance with this calculation program.

Specifically, the data saved at the address Ax is set for the variable x (Step #15-2). Then, a count value k for counting the number of calculations executed to identify the class name to which the variable x belongs (i.e. corresponding to the threshold number n) is set at "1" (Step #15-3) and the variable x and the first threshold value $b_1$ are compared with each other (Step #15-4). If $x<b_1$ (YES at Step #15-4), the calculation process is completed after the class name "$c_1$" is set for the class index y (Step #15-8). On the other hand, if $x \geq b_1$ (NO at Step #15-4), the count value k is incremented by 1 (Step #15-5) and it is then determined whether the count value k exceeds the threshold value number n (Step #15-6).

If k<n (NO at Step #15-6), this flow returns to Step #15-4 to compare the variable x and the second threshold value $b_2$. If $x<b_2$ (YES at Step #15-4), the calculation process is completed after the class name "$c_2$" is set for the class index y (Step #15-8). Thereafter, the variable x and the threshold value $b_k$ are compared with each other to calculate the class index to which the variable x belongs until k exceeds n (k>n) while incrementing the count value k by 1 every time. When k>n (YES at Step #15-6), the calculation process is completed after the class name "$c_{n+1}$" is set for the class index y (Step #15-7).

The above calculation process will be described with reference to the example of FIG. 4. Since the numerical index CDIX calculated at Step #9 is saved at the address Ax, it is set for the variable x, and the variable x (e.g. the numerical index CDIX) and the fist threshold value (smallest threshold value) "40", are compared with each other. (Step #15-4). If CDIX<40 (YES at Step #15-4), the class name to which the index value CIDX belongs is "C". Thus, the class name "C" is obtained as the class index (Step #15-8).

On the other hand, if CIDX$\geq$40 (NO at Step #15-4), the numerical index CIDX and the second threshold value "60" are compared with each other (Step #15-4). If CDIX<60 (YES at Step #15-4), the class name to which the index value CIDX belongs is "B". Thus, the class name "B" is obtained as the class index (Step #15-8).

If CIDX$\geq$60 (NO at Step #15-4), the numerical index CIDX and the third threshold value "90" are compared with each other (Step #15-4). If CDIX<90 (YES at Step #15-4), the class name to which the index value CIDX belongs is "A". Thus, the class name "A" is obtained as the class index (Step #15-8). Further, if CIDX$\geq$90 (NO at Step #15-4), the class name to which the index value CIDX belongs is "AA". Thus, the class name "AA" is obtained as the class index (Step #15-8).

Figure 10:
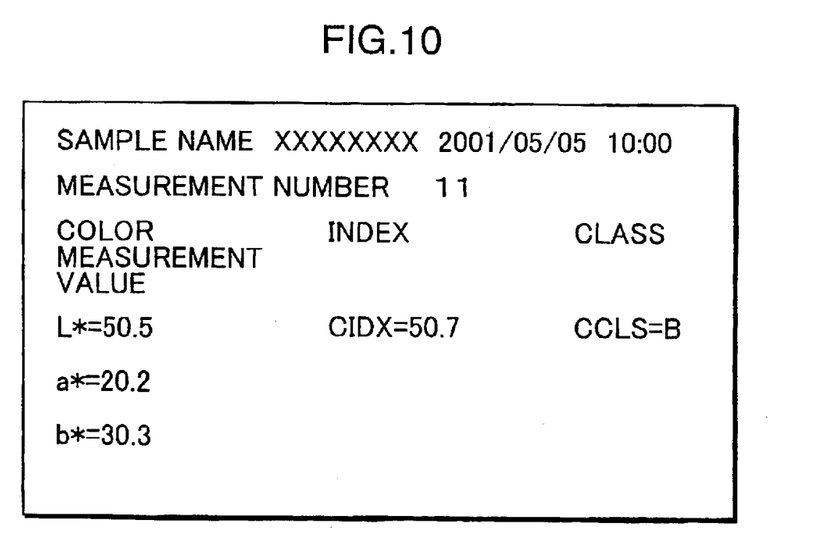
FIG. 10 is a diagram showing an exemplary display of results of measurement.

Referring back to the main flow shown in FIG. 6, upon completion of the measurement of color measurement values and the calculation of the user-defined numerical indices and the class indices, those values are displayed on the monitor 205, for example, in such a display mode as shown in FIG. 10 (Step #17). If the numerical indices have not been selected at Step #5 (NO at Step #5), the flow jumps to Step #11 to determine whether the class indices defined by the user have been selected (whether the class index CCLS has been selected in the example of FIG. 5). If the class indices have not been selected, either (NO at Step #11), this flow jumps to Step #17, where only the color measurement values are displayed on the monitor 205. For example, if the color measurement values (L*, a*, b*) according to the L*a*b* colorimetric system are calculated, this color measurement values are displayed on the monitor 205.

As described above, the colorimeter 10 of this embodiment receives the numerical index functions and/or the class index functions defined by the user in the mathematical format understandable by human, through the communication with the personal computer PC, saves them in the data memory 222, reads these index functions by the compiler program to replace them by the codes whose syntax is analyzable and whose operation is executable by the control unit 22, and the calculations of the numerical index functions and/or the class index functions is enabled using the function calculation program. Thus, it is sufficient to connect the calorimeter 10 with an external equipment such as the personal computer PC only when it is necessary to newly input, to the colorimeter 10, an index defining formula defined by the user. Therefore, the color measurement values can be calculated in accordance with the index arbitrarily defined by the user without reducing the portability of the colorimeter and reducing the convenience thereof.

The present invention is not limited to the foregoing embodiment and takes other variations and modifications such as described below if necessary.

(1) Although the syntactical error check is applied to the index function when the index function data is received from the personal computer PC in the foregoing embodiment, the present invention is not limited thereto. For example, the appropriateness of the index function may be confirmed by performing a trial calculation of the defined index using the calculated color measurement values.

(2) Although the data of the user-defined index defining formulae received from the personal computer PC are saved in the data memory 222 and the compiler program is started to replace the defining formulae by the codes executable in the control unit 22, every time the color measurement value is measured, the present invention is not limited thereto. For example, when the data of the user-defined index defining formulae are received, the compiler program may be started and the code generator 224e replaces the data by the codes executable in the control unit 22, and the storage controller 224g saves the data of the coded defining formulae in the data memory 222. On the other hand, when the color measurement value is measured, the replaced code data may be read from the data memory 222 to execute the calculating process of the indices.

With such an arrangement, in addition to the same functions and effects as the foregoing embodiment, the process can be performed more quickly since it is not necessary to replace the data of the user-defined index defining formulae saved in the data memory 222 by the codes executable in the control unit 22 every time the color measurement value is measured.

(3) Although, in the above described embodiment, the color measurement value calculator 224c calculates the color measurement values by the preset calorimetric system in accordance with the specified calculating formulae using the spectral reflection coefficients of the respective wavelength components calculated by the spectral characteristic calculator 224b, the present invention is not limited thereto. For example, a table stored beforehand in the program memory 221 or the like may be referred to based on the spectral reflection coefficients of the respective wavelength components calculated by the spectral characteristic calculator 224b, and the color measurement values by the preset colorimetric system may be read from this table. In other words, the color measurement value calculator 224c composes the deriving unit for deriving the color measurement values by the operation in accordance with the specified calculation formulae or deriving the color measurement value by reading them from the table.

(4) Although both the color measurement values by the preset general-purpose colorimetric system and the user-defined index are displayed on the monitor 205 in the foregoing embodiment, the present invention is not limited thereto. For example, only the user-defined index may be displayed. In the case of displaying both the color measurement value by the preset general-purpose colorimetric system and the user-defined index on the monitor 205, the color of the measured sample can be evaluated not only based on the user-defined index, but also based on the color measurement value by the general-purpose colorimetric system. As a result, a more convenient colorimeter can be realized.

(5) Although the reflected light from the sample S to be measured is dispersed into a plurality of wavelength components by the diffraction grating 165 of the sample light spectrum sensor 163 and by the diffraction grating 184 of the reference light spectrum sensor 182 in the foregoing embodiment, the present invention is not limited thereto. For example, if the sample S to be measured is transparent or semitransparent, a light having passed through the sample S may be dispersed by the diffraction grating 165 of the sample light spectrum sensor 163 and by the diffraction grating 184 of the reference light spectrum sensor 182.

(6) As to the numerical index and the class index, a single index or a plurality of numerical indices and class indices may be calculated or determined and displayed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A color measuring device for measuring color of an illuminated sample comprising:
    a light dispersing unit for dispersing light reflected by or having passed through the sample, into a plurality of spectral band components;
    a photoelectric unit for receiving the dispersed light components and outputting electric signals representative of the intensities of the light components;
    a color measurement value producing unit for producing data of color measurement values according to a predetermined colorimetric system, from the electric signals;
    a receiver for receiving, from outside of the device, data of an index defining formula defined by a user for converting the color measurement values to a user-defined index;
    a memory for storing the data of the index defining formula received by the receiver;
    a first converter for converting the data of the index defining formula stored in the memory, into coded data;
    a second converter for executing calculation according to the coded data of the index defining formula to convert the data of the color measurement values into data of the user-defined index; and
    a display for displaying the user-defined index converted by the second converter.

2. A color measuring device according to claim 1, wherein the user-defined index represents a value calculated from the color measurement values, using the index defining formula defined by the user.

3. A color measuring device according to claim 2, wherein the user-defined index represents a predefined class for the calculated value.

4. A color measuring device according to claim 3, wherein the index defining formula defined by the user includes information specifying the user-defined index, at least one threshold value for classification, and names of the class.

5. A color measuring device according to claim 1, wherein the user-defined index represents a predefined class for the color measurement values according to the predetermined colorimetric system.

6. A color measuring device according to claim 5, wherein the index defining formula defined by the user includes the color measurement values, at least one threshold value for classification, and names of the class.

7. A color measuring device according to claim 1, wherein the display further displays the color measurement values according to the predetermined colorimetric system.

8. A color measuring device according to claim 1, further comprising an error checker for checking an error in the index defining formula defined by the user.

9. A color measuring device according to claim 1, wherein the first converter includes a complier for converting the data of the index defining formula into the code data which can be executed by the second converter.

10. A color measuring device for measuring color of an illuminated sample comprising:
    a light dispersing unit for dispersing light reflected by or having passed through the sample, into a plurality of spectral band components;
    a photoelectric unit for receiving the dispersed light components and outputting electric signals representative of the intensities of the light components;
    a color measurement value producing unit for producing data of color measurement values according to a predetermined colorimetric system, from the electric signals;
    a receiver for receiving, from outside of the device, data of an index defining formula defined by a user for converting the color measurement values to a user-defined index;
    a first converter for converting the data of the index defining formula received by the receiver, into coded data;
    a memory for storing the coded data of the index defining formula;
    a second converter for executing calculation according to the coded data of the index defining formula stored in the memory to convert the data of the color measurement values into data of the user-defined index; and
    a display for displaying the user-defined index converted by the second converter.

11. A color measuring device according to claim 10, wherein the user-defined index represents a value calculated from the color measurement values, using the index defining formula defined by the user.

12. A color measuring device according to claim 11, wherein the user-defined index represents a predefined class for the calculated value.

13. A color measuring device according to claim 12, wherein the index defining formula defined by the user includes information specifying the user-defined index, at least one threshold value for classification, and names of the class.

14. A color measuring device according to claim 10, wherein the user-defined index represents a predefined class for the color measurement values according to the predetermined colorimetric system.

15. A color measuring device according to claim 14, wherein the index defining formula defined by the user includes the color measurement values, at least one threshold value for classification, and names of the class.

16. A color measuring device according to claim 10, wherein the display further displays the color measurement values according to the predetermined colorimetric system.

17. A color measuring device according to claim 10, further comprising an error checker for checking an error in the index defining formula defined by the user.

18. A color measuring device according to claim 10, wherein the first converter includes a complier for converting the data of the index defining formula into the code data which can be executed by the second converter.

19. A method for converting data of color measurement values according to a predetermined colorimetric system, into a user-defined index the method comprising:

receiving, from outside, data of an index defining formula defined by a user;

dispersing light reflected by or having passed through an illuminated sample, into a plurality of spectral band components;

receiving the dispersed light components and outputting electric signals representative of the intensities of the light components;

producing data of color measurement values according to a predetermined colorimetric system, from the electric signals;

converting the data of the index defining formula received from the outside, into coded data;

executing the calculation according to the coded data of the index defining formula to convert the data of the color measurement values into data of the user-defined index; and displaying the converted user-defined index.

20. A method for converting data of color measurement values according to claim 19, further comprising storing in a memory the data of the index defining formula received from the outside.

21. A method for converting data of color measurement values according to claim 19, further comprising the step of storing in a memory the coded data of the index defining formula.

* * * * *